Patented Dec. 18, 1934

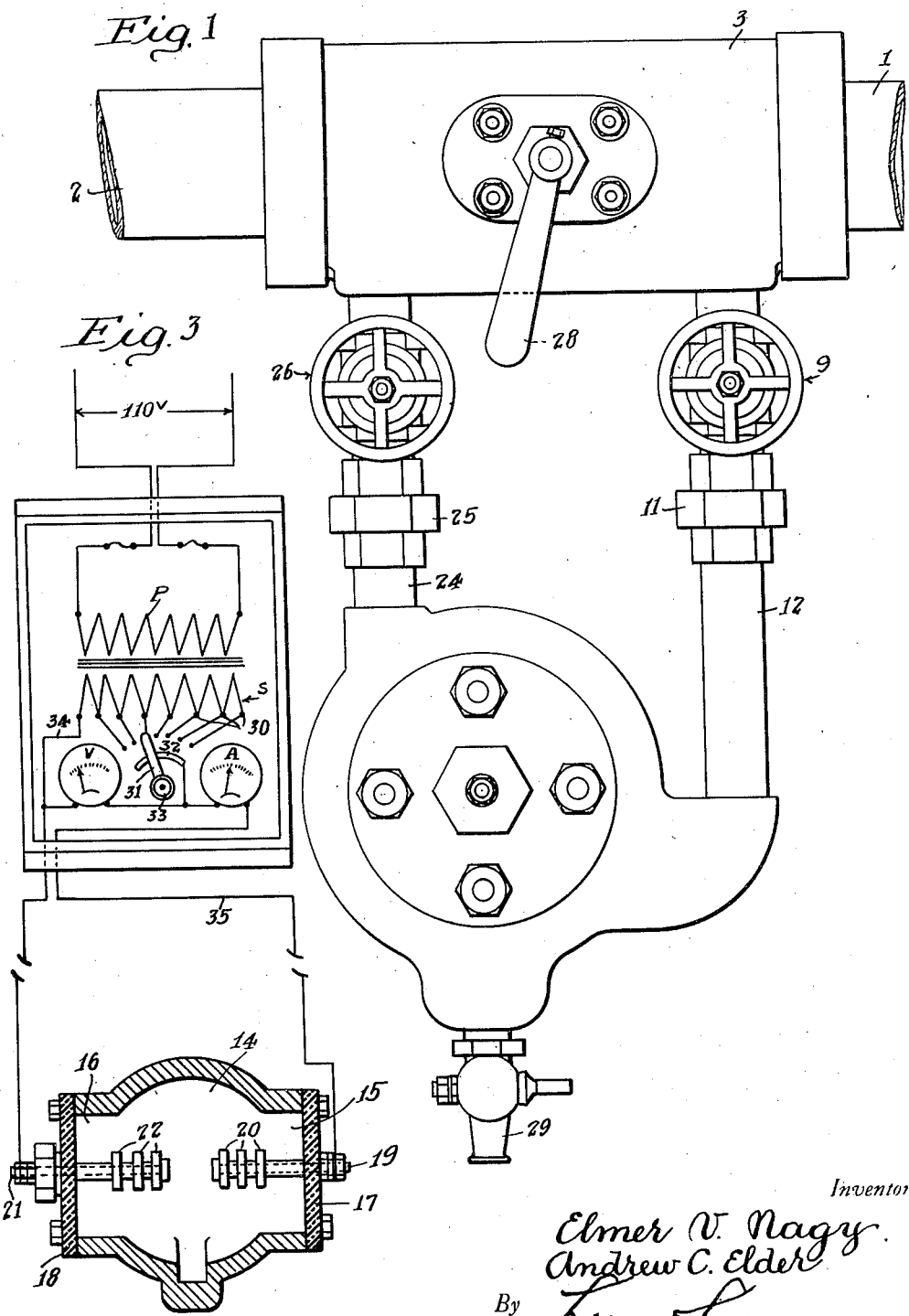

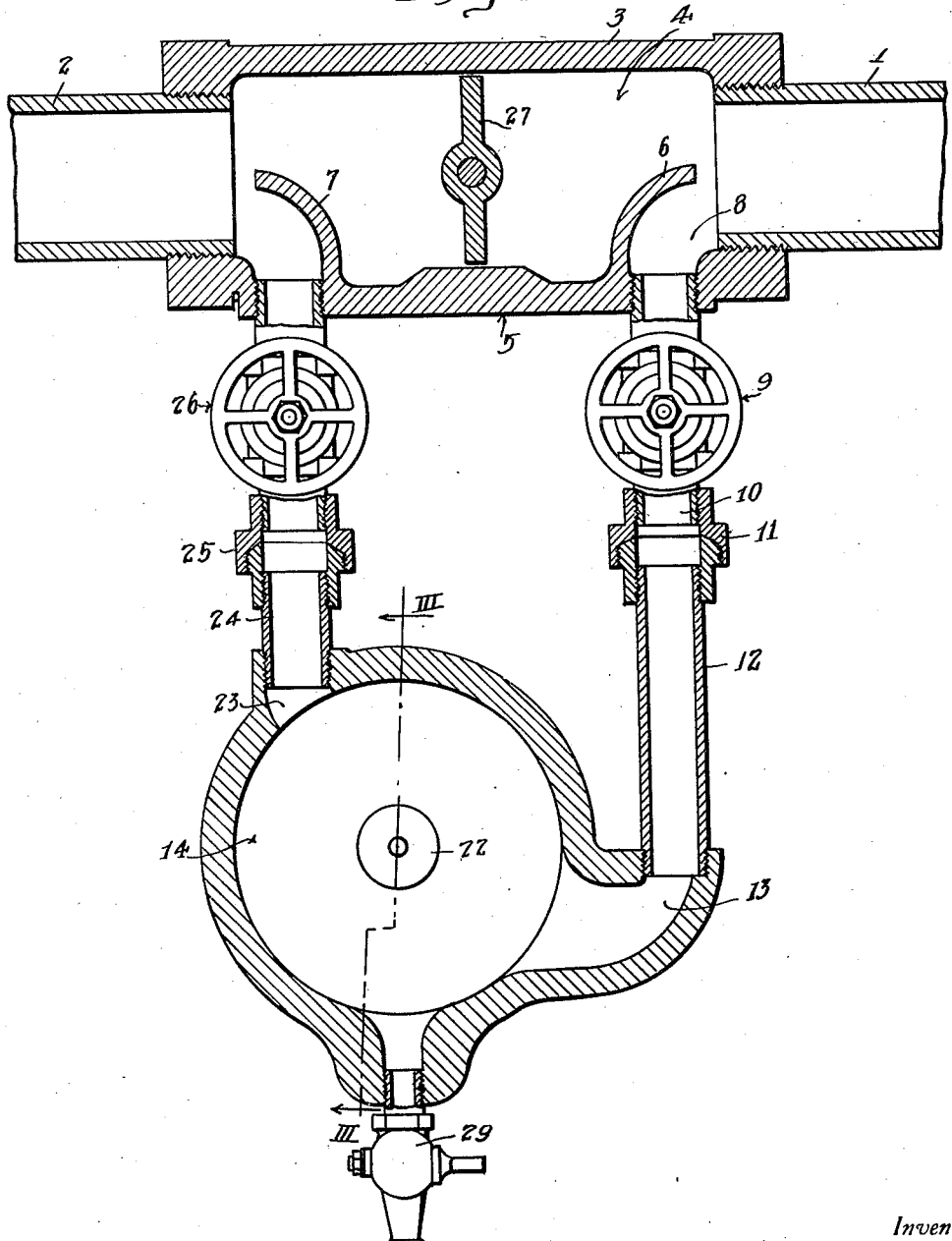

1,984,689

UNITED STATES PATENT OFFICE 1,984,689

LIQUID TREATING DEVICE

Elmer V. Nagy and Andrew C. Elder, Los Angeles, Calif., assignors of twenty per cent to Abraham Rothenberg, Los Angeles, Calif.

Application August 22, 1933, Serial No. 686,236

1 Claim. (Cl. 204—25)

Our invention relates to liquid treating devices, and has particular reference to apparatus for treating water and similar liquids containing salts in solution, to prevent the precipitation of such salts as hard scale. In pipe lines, boilers, refrigerators and the like, embodying conduits or pipes through which water or other liquids pass, considerable difficulty is encountered by the precipitation of salts from such fluids upon the pipes, in the form of a hard scale which either reduces the size of the opening in the pipe or conduit, to such extent as to greatly reduce the efficiency thereof, or forms a heat-insulating coating upon the interior of such pipes or conduits, preventing efficient heat exchange. This is particularly noticeable in water which is to be used in boilers and in refrigerating apparatus, the precipitation of such hard scale from the water, making it necessary to frequently clean the pipes or conduits, or to treat the water prior to its introduction into the boiler or refrigerating apparatus, with expensive chemicals to "soften" the water, or change the chemical composition of the salts normally in solution in the water, to salts which do not form hard scale.

We have discovered that it is possible to treat water supplied to boilers or refrigerating apparatus or the like, with relatively small charges of electric current, which so alters the character of the salts contained in the water, as to prevent the formation of hard scale.

It is therefore an object of our invention to provide a device for treating water to reduce scale precipitation therein, by passing electric current through the water prior to its introduction into the consuming apparatus.

Another object of our invention is to provide a device which may be readily interposed in a conduit leading to liquid-consuming apparatus for treating a portion of the liquid flowing through said conduit.

Another object of our invention is to provide a device of the character set forth in the preceding paragraph, in which the ratio of the treated water to the untreated water, may be readily varied.

Another object of our invention is to provide a device of the character set forth in the preceding paragraphs, in which the amount of electric current per unit of volume of water treated, may be readily adjusted.

Other objects of the invention will be apparent from the study of the following specification, read in connection with the accompanying drawings, wherein:

Figure 1 is a front elevational view of our water treating apparatus;

Figure 2 is a vertical sectional view of the water treating apparatus shown in Figure 1;

Figure 3 is a composite sectional view of the treating chamber, taken along line III—III of Figure 2, and illustrating the electric wiring employed in the practice of our invention.

Referring to the drawings, we have illustrated a fluid conduit 1, which may comprise any suitable pipe or conduit through which fluid may flow, the conduit 1 constituting an inlet through which water or the fluids may be passed to an outlet conduit 2. Interposed between the inlet conduit and the outlet conduit, is a coupling member 3 having a water passage or chamber 4 extending therethrough, the lower wall 5 of the coupling 3 being provided with a pair of deflecting baffles 6 and 7, one at each end thereof extending into and substantially across the interior of the chamber 4. Between the deflecting baffle 6 and the right-hand end of the coupling 3, is a small outlet opening 8 into which may be threaded one end of a valve 9, the other end 10 of which may be connected through a suitable union 11 to a nipple 12, which in turn is threaded into an entrance passage 13 in a water treating chamber 14. The water treating chamber 14 comprises a substantially cylindrical body member formed with open ends 15 and 16 arranged to be closed respectively, by end plates 17 and 18. The end plate 17 is preferably formed of electrically insulating material through which extends an electrode support 19, bearing upon its inner end a plurality of electrode discs 20. Similarly, the end plate 18 is formed of the insulating material through which an electrode support 21 extends, bearing upon its inner end a plurality of electrodes 22.

From an inspection of Figure 3, it will be observed that the two sets of electrode discs 20 and 22 are spaced apart within the chamber 14, and are electrically connected only through water or other liquid which fills the chamber. Thus, by connecting the electrode supports 19 and 21 to opposite poles of a suitable source of electric current, electric current will pass through any liquid contained in the chamber 14.

By referring again to Figure 2, it will be observed that an outlet passage 23 communicates with the chamber 14, and is connected through a suitable nipple 24, a union 25, a valve 26, to a small passage in the coupling 3 communicating with the interior thereof between the baffle 7 and the left-hand end of the coupling. Thus, liquid entering through the inlet conduit 1, will be deflected by the baffle 6 and directed down through the valve 9, into and through the treating chamber 14, and then will be passed up through the valve 26 and out to the outlet conduit 2. By forming the baffles 6 and 7 to extend partially over the cross-sectional area of the coupling 3, a portion only of the water or other liquid will be passed through the treating chamber, and the remainder of the liquid will pass directly through the coupling 3, without passing into the treating chamber. The relative quantities of liquid passing through the treating chamber, and by passing the treating chamber, may be readily controlled by means of a suitable butterfly valve 27 arranged to be actuated by a handle 28, which may be placed in any convenient location exteriorly of the coupling 3. Also by suitably adjusting the valves 9 and 26, the relative quantities of liquids passed to the chamber, and by passing the chamber, may also be controlled, though we prefer to employ the valves 9 and 26 only for the purpose of cutting off communication between the treating chamber and the coupling, to permit the treating chamber to be removed and cleaned whenever necessary.

It will also be observed that the lower end of the treating chamber 14, is provided with a blow-off cock 29, which may be opened while water is flowing through the chamber 14, to drain or blow out any sediment or salts which may be precipitated in the chamber 14.

Water passing through the conduits 1 and 2, may contain varying quantities of salts in solution, and if only a portion of this water is treated by passing an electric current through the same, an alteration of either the physical characteristics of the salts or the chemical composition of the salts will take place, not only in the quantity of water so treated, but also in the total quantity of water passing through the conduits 1 and 2 after the treated water has been returned to the conduit 2. The effect of such electrical treatment is to cause a distinct diminishing in the amount of salts precipitated, and those salts which are precipitated, form in soft, spongy, porous masses, as distinguished from the usual hard, compact scale normally precipitated when water is boiled or treated to considerable change in temperature.

The character of the salts in any given sample of water, may require different material to be employed as the electrode discs 20 and 22, though it happens that carbon, iron, steel, brass, or bronze discs may be readily employed for the treatment of most of the salts found naturally in water used for boiler and refrigeration purposes.

In view of the fact that the quantity and character of the salts in the liquid to be treated, may vary between relatively wide limits, dependent upon the fluid selected, or dependent upon the natural characteristics of the water which is to be used, the resistance to the passage of the liquid current between the electrodes 20 and 22, will vary in substantially inverse ratio to the quantity of salts in the liquid. Thus, with an electric current supply of a given voltage, the greater the quantity of salt, the greater the amperage which would be passed through the liquid in the chamber 14. We find that substantially uniform results can be obtained by maintaining the current constant, and varying the voltage of the supply in accordance with changes in the quantity of salts in the liquid.

In Figure 3, we have illustrated diagrammatically, a form of control which may be used with our invention, in which the voltage supplied to the electrodes, may be readily varied. We have illustrated a suitable source of supply indicated by the legend 110$^v$, which may be the ordinary lighting circuit found in general practice. To the source may be connected the primary winding "P" of the transformer, the secondary "S" of which is provided with a number of taps 30 arranged to be connected through a switch arm 31 to a segmental contact 32, the switch arm being arranged to be moved from one of the taps to another, by means of a suitable hand wheel or handle 33. One end of the secondary winding of the transformer is connected through a conductor 34 to the electrode support 21, while the segmental contact 32 is connected through a conductor 35 to the opposite electrode support 19, the conductor 35 preferably having an ammeter "A" in series relation therewith. Thus, the handle 33 may be adjusted to any desired position to insure the passage of a predetermined amperage through the chamber 14. For example, if the "hardness" or chemical content of water to be treated is such that at forty volts, fifteen amperes would pass between the electrodes, any increase in the chemical content of the water would reduce the resistance, and at forty volts a greater current would pass through the water. However, by adjusting the handle 33 the amperage may be maintained at fifteen amperes, even though the resistance is lessened. We find that by maintaining the current substantially constant, the effectiveness of the treatment remains substantially constant even though the quantity of chemical may vary to a considerable extent. If desired, a volt meter "V" may be connected across the electrode circuit to assist an operator in determining the voltage drop across the electrodes, to further assist in determining the proper setting of the switch 31.

The operation of our device will be best understood with reference to one assumed installation. If, for example, it is desired to treat the water passing to a boiler, the coupling 3 may be interposed in the feed line to the boiler, and the water passing through this feed line will have a portion thereof diverted by the baffle 6, into and through the chamber 14. If it is desired to treat all of the water, the valve 27 may be closed, which will insure the passage of all of the water through the chamber, while if the degree of hardness of the water is such that it is unnecessary to treat all of the water, the valve 27 may be opened so that only a portion of the feed water will pass through the treating chamber. The operator may select the amount of current to be supplied to the treating chamber, and if, for any reason, the chemical content of the water changes during the operation of the machine, he may readily adjust the switch 31 to increase or reduce the voltage supplied to the electrodes, and thus maintain a constant flow of current through the water. While we prefer to construct the electrodes 20 and 22 of non-corrosive material, certain chemicals found in natural water may attract them, and in addition, a considerable quantity of the chemicals in the water will be precipitated in the chamber 14 and may accumulate upon the electrodes. In such event, the electrodes may be cleared to a large extent by merely opening the blow-off cock 29, allowing a portion of the water to escape directly from the chamber 14. However, after the device has been in operation for a considerable length of time, it should be opened and thoroughly cleaned, which may be readily done by removing the end plates 17 and 18, and cleaning the electrodes in any suitable manner.

While we have shown and described a preferred embodiment of our invention, we do not desire to be limited to any of the details disclosed herein, except as defined in the appended claim.

We claim:

In a device for treating liquids flowing through a conduit, a coupling interposed in said conduit, having a liquid passage therethrough and having auxiliary inlet and outlet openings communicating with said liquid passage, baffle means in said coupling adjacent said auxiliary inlet and outlet openings for diverting a portion of the liquid flowing into said coupling from said liquid passage and through said auxiliary inlet and outlet openings, and a valve for substantially closing off said liquid passage interposed between said auxiliary inlet and outlet openings and operable to restrict said liquid passage to regulate the ratio of liquid diverted through said auxiliary inlet and outlet openings, and electrolytic treating means in communication with said auxiliary inlet and outlet openings.

ELMER V. NAGY.
ANDREW C. ELDER.